United States Patent [19]
Klingler et al.

[11] Patent Number: 4,601,109
[45] Date of Patent: Jul. 22, 1986

[54] MEASURING PROCESS FOR THE INSPECTION OF TURNED PARTS FINISHED ON BOTH SIDES THEREOF AND INSTALLATION FOR IMPLEMENTING THE PROCESS

[75] Inventors: Otto Klingler, Oberndorf-Boll; Günther Ross, Oberndorf, both of Fed. Rep. of Germany

[73] Assignee: Mauser-Werke Oberndorf GmbH, Fed. Rep. of Germany

[21] Appl. No.: 682,680

[22] Filed: Dec. 18, 1984

[30] Foreign Application Priority Data

Dec. 20, 1983 [DE] Fed. Rep. of Germany ....... 3345936

[51] Int. Cl.$^4$ ............................................. G01B 7/28
[52] U.S. Cl. ..................................... 33/517; 33/503; 33/549; 33/553
[58] Field of Search .............. 33/503, 504, 505, 517, 33/549, 530, 551, 556, 553, , 573; 408/2, 8; 29/705, 709, 711

[56] References Cited

U.S. PATENT DOCUMENTS

| | | | |
|---|---|---|---|
| 3,605,909 | 9/1971 | Lemelson | 33/504 |
| 3,839,800 | 10/1974 | Bederman et al. | 33/504 |
| 3,840,994 | 10/1974 | Izumi et al. | 33/503 |
| 3,889,380 | 6/1975 | Albertazzi | 33/549 |
| 4,182,044 | 1/1980 | Peonski | 33/517 |
| 4,313,263 | 2/1982 | McMurtry | 33/503 |

FOREIGN PATENT DOCUMENTS 556714 12/1974 Switzerland ............................ 408/2

*Primary Examiner*—Willis Little
*Attorney, Agent, or Firm*—Scully, Scott, Murphy & Presser

[57] ABSTRACT

A measuring process for evaluation of the machining capability or quality of multi-spindle rotary machining or turning unit utilized for the production of preferably rotationally-symmetrical workpieces which are to be finished on both sides, and for the intermediate and/or final evaluation of workpieces which are finished in that manner. Furthermore, the invention also relates to a measuring installation for the implementation of this measuring process. The foregoing objects are inventively achieved in the measuring installation which is independently programmable relative to the multi-spindle rotary machining unit, measures multi-dimensionally and is autonomous in itself, is roughly positioned in front of the applicable workpiece pickup arrangement of the multi-spindle rotary machining unit, and through sensing with measuring feelers of the measuring installation at predetermined reference points, measures in a first step the correctly positioned pickup of the workpiece which is clamped into the workpiece pickup device, and decides with regard whether the turning is to be effected, through providing a signal to the control arrangement of the multi-spindle rotary machining unit, and the workpiece after the effected turning in a second step, so as to decide with regard to its further treatment through a signal transmission to the control arrangement of the multi-spindle rotary machining unit.

7 Claims, 3 Drawing Figures

4,601,109

MEASURING PROCESS FOR THE INSPECTION OF TURNED PARTS FINISHED ON BOTH SIDES THEREOF AND INSTALLATION FOR IMPLEMENTING THE PROCESS

BACKGROUND OF THE INVENTION

1. Field of the Invention

The present invention relates to a measuring process for the evaluation of the machining capability or quality of a multi-spindle rotary machining or turning unit utilized for the production of preferably rotationally-symmetrical workpieces which are to be finished on both sides, and for the intermediate and/or final evaluation of workpieces which are finished in that manner. Furthermore, the invention also relates to a measuring installation for the implementation of this measuring process.

2. Discussion of the Prior Art

The production of turned parts which are to be finished on both sides in a fully automatically operating rotary machining installation necessitates a measuring cycle in addition to the clamping and finishing cycles. A certain finishing, clamping and measuring cycle is necessary in all instances when the turned parts which are to be finished consist of relatively thin-walled parts which possess a high degree of precision, at partly only relatively close tolerances. Concerning the production quality of such turned parts, in addition to the final finishing, each intermediate finishing step and each intermediate clamping procedure has a quite significant influence thereon. The intermediate finishing steps are then especially critical when the formfitting of the workpiece into the subsequent clamping arrangement depends upon their degree of exactness. An inadequate degree of exactness produces a deformation of the thin-walled parts during their clamping on the subsequent clamping device. Hereby, there is assumed that a form-fitted connection is present between the workpiece and the clamping device, which is necessary because of the inadequate stability in shape of uniformly thin-walled parts.

Furthermore, for such thin-walled turned parts, the transfer steps and clamping steps are critical inasmuch as the subsequent correctly-shaped finishing depends upon the positionally correct transfer of the parts from one clamping device to the subsequent clamping device and, presently, its correct clamping into this subsequent clamping device. Furthermore, the condition of the work tool and the wear of the work tool must be taken into consideration inasmuch as, because of the frequently only short worktool life, there is obtained a deviation in the shape of the workpieces, which can preclude any subsequent finishing.

SUMMARY OF THE INVENTION

Accordingly, it is an object of the present invention to provide a measuring process and an installation for the implementation of this measuring process of the above-mentioned type which on one hand, can measure and ascertain as to whether the parts have been transferred correctly positioned and then clamped, and on the other hand, whether the parts have been correctly finished. Hereby, it is a further object to be able to decide as to whether it is possible to effect a further finishing of the workpiece or its further processing.

The foregoing objects are inventively achieved in that a measuring installation which is independently programmable relative to the multi-spindle rotary machining unit, measures multi-dimensionally and is autonomous in itself, is roughly positioned in front of the applicable workpiece pickup arrangement of the multi-spindle rotary machining unit, and through sensing with measuring feelers of the measuring installation at predetermined reference points, measures in a first step the correctly positioned pickup of the workpiece which is clamped into the workpiece pickup device, and decides with regard to whether turning is to be effected, through a providing signal transmission to the control arrangement of the multi-spindle rotary machining unit, and measures the workpiece after the effected turning in a second step, so as to decide with regard to its further treatment through a signal transmission to the control arrangement of the multi-spindle rotary machining unit.

In order to ensure a high-quality finishing, and to be able to preclude the workpieces from having to undergo any subsequent finishing and from becoming rejects, there can be undertaken between the measuring device and the respective finishing stations, as well as between individual finishing stations of the multi-spindle rotary machining unit, an information exchange with regard to the turning or rotary machining which is to be effected and the further treatment of the workpiece subsequent to the turning, and the measuring device can then automatically travel independently programmable relative to the finishing and clamping cycles, towards the currently addressed finishing station of the multi-spindle rotary machining unit. Through the multi-dimensional measuring device there can be further undertaken point sensings on the clamped workpiece, based on relative consideration thereof, there can be computed the production characteristics for the evaluation of the processed workpiece. Inventively, the measuring device can orient itself on the clamped workpiece, and implement a rated-actual value comparison independently of the positioning of the workpiece.

The measuring installation for implementing the measuring process distinguishes itself in that it possesses a measuring carriage which is automatically displaceable across the entire finishing or machining arrangement on bridge supports extending transversely of the longitudinal axes of the spindles of the multi-spindle rotary machining unit, and which is positionable and fixable in an independently programmable manner in predetermined positions in front of the workpiece pickup devices through a vertical displacing movement or stroke, and wherein the measuring carriage is equipped with a multi-coordinate measurement head which will orient itself on the clamped workpiece and which possesses feelers which carry out a rated-actual value comparison on the workpiece through point sensing, independently of the positioning of the workpiece.

In a particularly simple embodiment, the multi-coordinate measurement head can be a two-dimensionally measuring sensor head whose feelers are displaceable merely within the horizontal coordinates X and Y. Furthermore, the measuring installation can represent an inherently autonomous operational unit which is fixedly anchored in the system with the multi-spindle rotary machining unit.

Through the intermediary of the inventive measuring process and the arrangement for implementing of this measuring process, it is ensured that the production of particularly thin-walled turned parts which are to be finished on both sides in independent sizes and configurations can be carried out through different measuring strategies; in essence, the measuring strategy for the evaluation of the machining capability, the measuring strategy for economical production support, and the measuring strategy for final control. The measuring strategy for evaluation of the machining capability in the production of thin-walled turned parts which are to be finished on both sides, for the finishing procedure of the front and the rear surface on multi-spindle rotary machining units with a direct transfer of the workpiece from the first to the second turning spindle, is facilitated by the invention through an independently programmable, two-dimensional measuring installation which can be introduced into the finishing machine. The workpieces are measured in the clamped condition prior and subsequent to the transfer of the workpiece to the applicable turning spindle. The evaluations of typical manufacturing errors, for example, such as shaping and contour errors, deformation of the workpiece through re-clamping of the workpiece, are undertaken through point sensing with the two-coordinate measuring apparatus, such that, in relative consideration, the manufacturing errors can be computed with a degree of assurance. Inasmuch as the multi-spindle turning machines preferably incorporate horizontally arranged rotary spindles, the arrangement of the two-dimensional coordinate axis is preferably only within the horizontal plane. On the one hand, this will provide the advantage of balanced feeler weights for the assurance of constant measuring forces and, on the other hand, improved cleaning of the measured points during the finishing sequence, inasmuch as no collecting surfaces are present for accumulating of liquids and dust. The measuring installation is an autonomous operating unit, which can be roughly positioned in the simplest manner in front of the finishing or machining spindle. The measuring functions are provided by computed automatic alignment and due to the system precision of the measuring installation, the rated-actual value comparison can be carried out independently of the positioning of the workpiece. The errors in concentricity are determined in combination with the rotary spindle.

The advantage of the measuring process is based on a simple manipulation of the measuring installation with small measurement areas which are dimensioned in accordance with the sizes of the workpiece, while the measuring installation can be transported with the aid of hand-operated apparatuses from station to station. Moreover, during the finishing, for the protection of the highly sensitive measuring installation, the latter can be distanced from the work area. The measurement cycles can be determined through an independent programming so as to render possible an optimum utilization of the measuring installation for different measuring strategies. In accordance with the knowledge obtained over the machining capability at the individual turning or rotary machining stations, the invention facilitates the provision of an economical and production- enhancing measuring technology, in that the known, typically encountered machine production errors need only to determine, and possibly correct, the work tool wear and the transfer errors caused by workpiece reclamping. These errors are determinable through the primary parameters, such as end surface—internal diameter, external diameter and depth measurement sensing.

The measuring installation, in an advantageous manner, affords the capabilities that the workpiece which is to be finished can be measured prior to the final and intermediate finishing steps, the workpiece position can be determined subsequent to a changing sequence and the worktool wear determination, and a control implemented over the changing procedure of workpiece collet chucks.

BRIEF DESCRIPTION OF THE DRAWINGS

Reference may now be had to the following detailed description of an exemplary embodiment of the invention, taken in conjunction with the accompanying drawing; in which.

DETAILED DESCRIPTION

Figure 1:
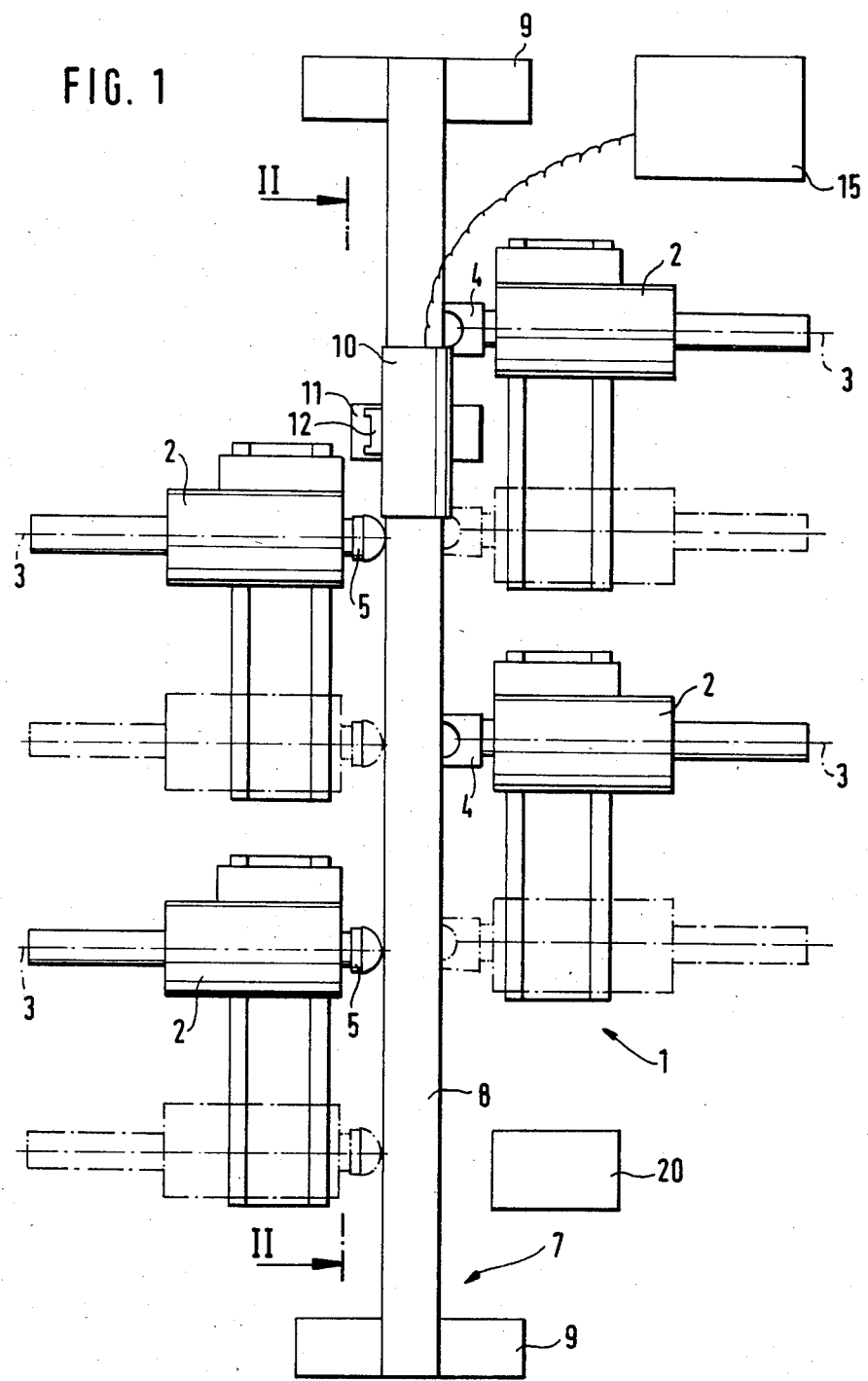
FIG. 1 illustrates a generally diagrammatic plan view of a multi-spindle rotary machining unit with a measuring installation.
Figure 2:
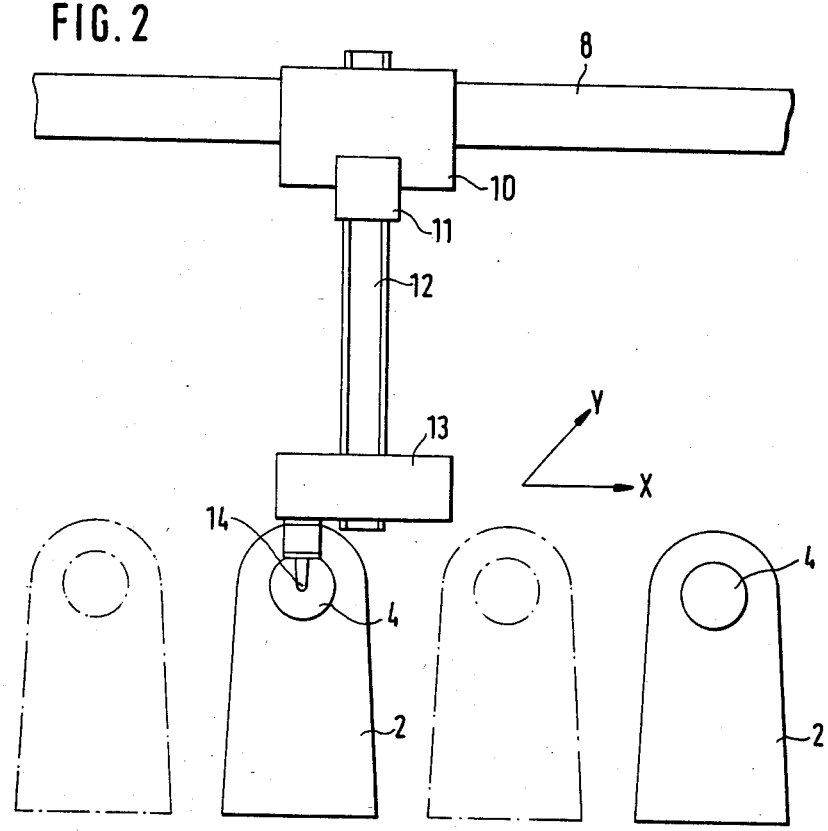
FIG. 2 is a side view of the measuring installation taken along line II—II in FIG. 1.
Figure 3:
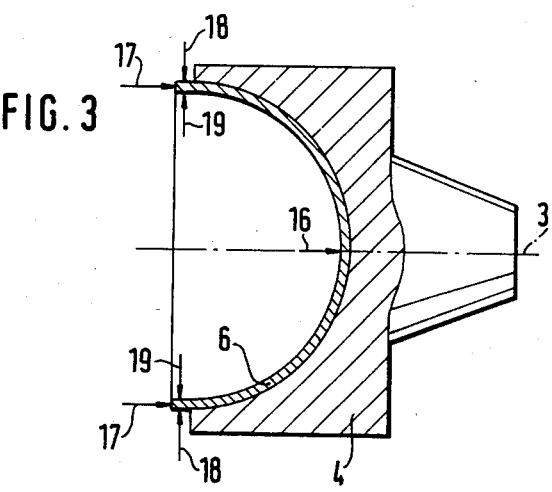
FIG. 3 illustrates a workpiece clamped in a workpiece pickup device with measurement points.

In FIG. 1, schematically illustrated in plan view, a multi-spindle rotary machining or turning unit 1 has the form of a transfer train. Herein, the multi-spindle turning unit 1 consists of four spindle units 2 which can be displaced transversely into the phantom-illustrated position as well as directly towards each other for the purpose of workpiece transfer. The spindle units 2 receive workpiece pickup devices 4 and 5 coaxially with the spindle axis 3. As can be ascertained from the workpiece pickup devices 4 and 5, in the multi-spindle turning unit 1 there are to be produced, in essence, spherical half-shells 6 through turning or rotary machining. The half-shells 6 are thin-walled and of a high precision so as to necessitate an accurate manufacture, as well as a faultless workpiece transfer and workpiece positioning, when subsequent to the internal finishing of the half-shell 6 there is to be carried out the external finishing which is dependent upon the accuracy of the former.

At this point, there must be indicated that, in lieu of such spherical half-shells 6, there can be produced and measured other suitable workpieces in such a machining unit. Especially suitable are always workpieces which are to be finished or machined on both sides thereof and which are rotationally-symmetrical, and on which there are allowed only extremely close manufacturing tolerances.

A measuring installation 7 is constructed in the form of a portal bridge, whose bridge support 8 extends transversely of the spindle axes 3 of the spindle units 2, and which is supported on end columns 9. The bridge support 8 spans over the entire multi-spindle turning unit 1 at a vertical spacing above the spindle units 2. Movable along the bridge support 8 in the longitudinal direction thereof is a measuring carriage 10. The measuring carriage 10 further includes a cross-beam 11 in a parallel arrangement relative to the spindle axes 3. The measurement head 13 is movable on the vertical rail 12 of the measuring carriage 10, and is equipped with feelers 14 in the horizontal coordinates X and Y.

The measurement head 13 is roughly positionable through a vertical lifting movement in front of the workpiece pickup device 4 or 5. This is effected through the depositing of the measurement head 13, for instance, on a known per se three-point clamping plate.

The invention proceeds from the basic concepts that for the assurance of an accurate production, for example, of thin-walled spherical half-shells 6 in unrestricted sizes and configurations, there are required measuring procedures with the following strategies:

(a) Measuring strategy for evaluating the machining capability;

(b) Measuring strategy for the support of the production; and (c) Measuring strategy for final control;

in which the entire turning or rotary machining takes place on both sides, as well as the measuring process are effected fully automatically. In accordance with the sequence of the manufacturing processes, a predetermined measuring cycle is necessary, in which there are to be measured the intermediate machining or finishing steps, the transfer and clamping steps and the worktool condition as well as the worktool wear. The following tasks are solved by the measuring installation 7 which is integrated into the multi-spindle turning unit 1 in an advantageous manner:

(a) Measurement and recognition as to whether the workpieces are transferred correctly positioned and are clamped. Furthermore, through a signal input to a central control unit 15, there is decided as to whether it is possible to proceed with a further finishing of the workpiece 6 or as to whether there must be initiated a renewed transfer procedure.

(b) Measurement and recognition as to whether the workpiece 6 was correctly machined. Furthermore, before deciding as to whether the workpiece 6 is to be transferred into the workpiece pickup device 4 or 5 of the subsequent spindle unit 2, whether a following finishing treatment is possible, or whether a reject is present.

Between the measuring installation 7 and the spindle units 2, as well as between the individual spindle units 2, there is thus provided an information exchange through the central control unit 15, whereby there is assured a high-quality manufacturing process; in essence, the workpieces 6 are precluded from a follow-up treatment and from becoming rejects. The measuring procedure for the evaluation of the machining capability of multi-spindle turning units 1 with the transfer of workpieces 6 from rotary spindle to rotary spindle is implemented through an independently programmable, two-dimensional measuring installation 7, which is introduced into the processing machine.

Workpieces 6 are measured in the clamped condition prior and subsequent to each workpiece transfer to the applicable workpiece pickup device 4 or 5. For determination or evaluation of the typical manufacturing errors, such as errors in the diameters 18, 19 and depth 16, 7, shape and contour errors, and deformation of the workpiece 6 caused by workpiece reclamping, point sensings are undertaken with the feelers 14 of the measurement head 13, such that, in relative consideration, the manufacturing errors can be determined with in the control unit 15.

Inasmuch as the multi-spindle rotary machining or turning unit 1 preferably incorporates horizontally oriented rotary spindles, the orientation of the coordinate axes X and Y lies in the horizontal plane. This provides the advantage of the balanced feeler weights to ensure constant measurement forces and further facilitates, during the manufacturing process, an improved cleaning of the measured points, inasmuch as there are no collecting surfaces present for the accumulation of liquids and dust.

It is essential in the inventive measuring process that the measuring installation 7 represents an inherently autonomous operational unit, in which the measurement head 13 is roughly positioned in front of the finishing or machining spindle or, respectively, the workpiece pickup device 4, 5. Hereby a rigid anchoring of the system of the measuring installation 7 with respect to the multi-spindle turning unit 1 is a necessity. The actual measuring function is then effected in a computable automatic orientation on the clamped workpiece 6. On the basis of the precision of the system there can now be implemented the rated-actual comparison independently of the positioning of the workpiece. The possible errors in concentricity are then determined in combination with the rotary spindle which has been set into rotation.

The advantage of the measuring process is predicated on a simple manipulation of the measuring installation 7 with small measurement areas which are dimensioned relative to the workpiece sizes, whereby the entire measuring installation is automatically movable from processing station to processing station. It is also advantageous that the measuring installation can be distanced from the work area during the finishing sequences. Since the measuring cycles are determined in an independent programming relative to the work and clamping cycles, there is afforded an optimum utilization of the measuring installation 7.

After obtaining knowledge over the condition of the evaluation of the machining capability at the individual spindle units 2, it is possible to simply provide a production-supportive measuring technology in that of the known, production errors typical of the machining, there need be determined, and possibly corrected, only the work tool wear and possible transfer errors. Such errors can be determined through the primary magnitudes, for example, such as the end surface-internal diameter 19, end surface-external diameter 18, and depth measurement sensing 17, 16.

The final control is now implemented with the measuring installation 7 completely outside of the machining area. For this purpose, the measurement head 13 is conveyed with the measuring carriage 10 to an externally located measuring location 20, at which there is measured the deposited, finish-machined workpiece 6.

What is claimed is:

1. In a measuring process for evaluating the machining capability of a multi-spindle rotary machining unit for the production of rotationally-symmetrical workpieces which are to be finished on both sides, and for the intermediate and final evaluation of workpieces machined in said unit; the improvement comprising: positioning a measuring installation in front of a workpiece pickup device of said rotary machining unit, said measuring installation being independently programmable, multi-dimensionally measuring and autonomously operating relative to the multi-spindle rotary machining unit; measuring in a first step through sensing with feelers of the measuring installation at predetermined reference points the correctly positioned pickup of the workpiece which is clamped into the workpiece pickup device; transmitting a signal input to a control arrangement of the multi-spindle rotary turning unit to decide whether to implement a subsequent rotary machining sequence; measuring the workpiece in a second step subsequent to implementing the rotary machining; and transmitting a further signal to the control unit to decide whether to implement further processing of the workpiece.

2. A measuring process as claimed in claim 1, comprising implementing an information exchange between the measuring installation and an applicable finishing station and between individual finishing stations of the multi-spindle rotary machining unit relative to the subsequent turning and further processing of the workpiece after said turning; and automatically moving the measuring installation independently programmable relative to the finishing and clamping cycles to an applicable addressed processing station of the multi-spindle rotary machining unit.

3. A measuring process as claimed in claim 1, wherein the measuring installation is a multi-dimensional measuring installation implementing point sensings on the clamping workpiece; and computing in relative consideration therefrom the production characteristics for evaluation of the processed workpiece.

4. A measuring process as claimed in claim 1, wherein the measuring installation automatically orients on the clamped workpiece, and implements a rated-actual value comparison independently of the positioning of the workpiece.

5. In a measuring installation for evaluating the machining capability of a multi-spindle rotary machining unit for the production of rotationally-symmetrical workpieces which are to be finished on both sides, and for the intermediate and final evaluation of such finished workpieces, the improvement comprising: said measuring installation including a measuring carriage which is automatically movable over the entire machining unit on a bridge support extending transverse to the longitudinal axes of the spindles of said multi-spindle rotary machining unit; said measuring installation being automatically displaceable into independently programmable and positionable end fixed positions in front of workpiece pickup means through vertical movement of a measurement head on said carriage, said measurement head being a multi-coordinate measurement head adapted to orient itself on the clamped workpiece, and including feelers on the measurement head implementing a rated-actual comparison on the workpiece through point sensings independently of the positioning of the workpiece.

6. A measuring installation as claimed in claim 5, wherein the multi-coordinate measurement head comprises two-dimensionally measuring sensor head having sensing feelers movable within horizontal coordinates.

7. A measuring installation as claimed in claim 5, wherein said measuring installation comprises an autonomous operational unit which is connected into a system in a fixed anchoring with said multi-spindle rotary machining unit.

* * * * *